United States Patent [19]
Immenroth et al.

[11] 3,797,158
[45] Mar. 19, 1974

[54] ROLLER TIP FOR FISHING RODS

[75] Inventors: Otto Immenroth, La Habra; Robert C. Eschbach, Newport Beach, both of Calif.

[73] Assignee: Axelson Fishing Tackle Mfg. Co., Newport Beach, Calif.

[22] Filed: Aug. 21, 1972

[21] Appl. No.: 282,124

Related U.S. Application Data
[63] Continuation of Ser. No. 44,085, June 8, 1970, abandoned.

[52] U.S. Cl. ................................. 43/24
[51] Int. Cl. ............................... A01k 87/04
[58] Field of Search ...................... 43/24

[56] References Cited
UNITED STATES PATENTS

| | | | |
|---|---|---|---|
| 3,006,099 | 10/1961 | Gourley, Jr. | 43/24 |
| 2,502,846 | 4/1950 | Hoffman | 43/24 |
| 521,704 | 6/1894 | Davis | 43/24 |
| 3,058,255 | 10/1962 | Gorham | 43/24 |

Primary Examiner—Louis G. Mancene
Assistant Examiner—Daniel J. Leach
Attorney, Agent, or Firm—Richard L. Gausewitz

[57] ABSTRACT

A roller tip comprising a single piece of sheet metal formed and bent into parallel frame sides which are flanged to prevent wear on the line. Each frame side is integral with a semitubular sleeve side portion, and such side portions are connected to each other at upper and lower seams in order to form a sleeve adapted to receive the tip of a fishing rod. A roller is rotatably mounted between the frame sides, by means of axle means extending perpendicularly to such sides. The frame sides are integral with opposite ends of a bridge disposed above the roller and preventing the line from leaving the roller tip, such bridge being so constructed that the portion thereof lying in a medial plane between said frame sides is generally parallel to a tangent to the roller, such tangent intersecting an extended axis of the sleeve on the opposite side of the axle means from such sleeve.

7 Claims, 13 Drawing Figures

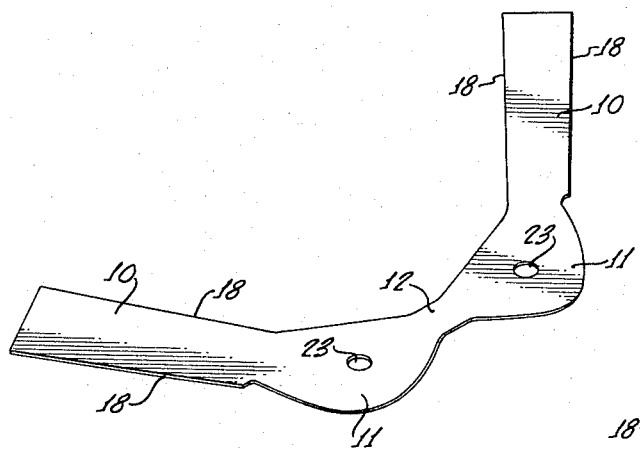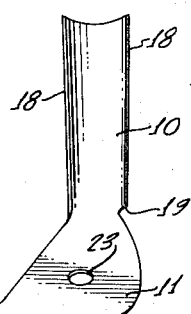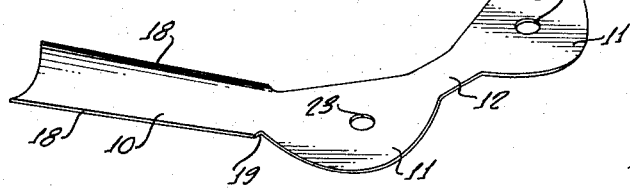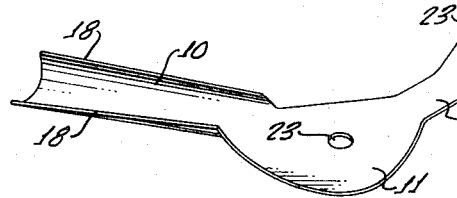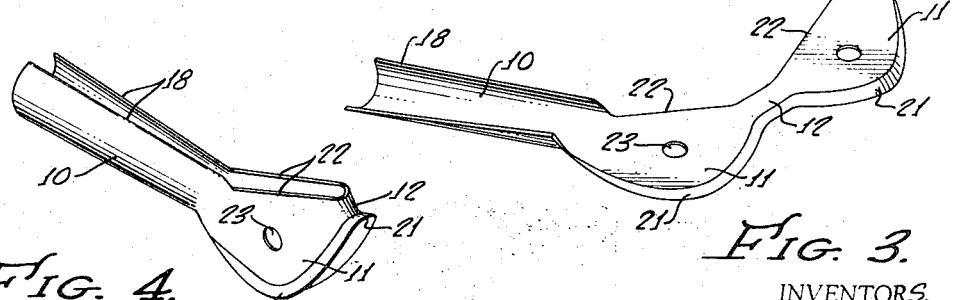

INVENTORS
OTTO IMMENROTH
ROBERT C. ESCHBACH
ATTORNEYS.

ROLLER TIP FOR FISHING RODS

CROSS REFERENCE TO RELATED APPLICATION:

This application is a continuation of our copending patent application Ser. No. 44,085, filed June 8, 1970, for Roller Tips for Fishing rods, now abandoned.

BACKGROUND OF THE INVENTION:

1. Field of the Invention

This invention relates to the field of roller tips for fishing rods, primarily saltwater fishing rods but also including freshwater fishing rods.

2. Description of the Prior Art

Prior-art roller tips for fishing rods have been characterized by one or both of the following important disadvantages: (a) high cost or (b) low quality. An example of the high-quality but high-cost roller tip is shown in U.S. Pat. No. 3,006,099. One of the major reasons for the high cost of this tip is that the frame must be connected to a sleeve which is formed as a separate deep-drawn part. Not only does the cost of the sleeve greatly increase the cost of the product, but the sleeve and the frame must be connected to each other by a laborious and expensive soldering operation.

Several other examples of prior-art roller tips are shown in U.S. Pat. Nos. D. 101,236 and 3,058,255.

SUMMARY OF THE INVENTION:

The roller tip comprises a single piece of sheet metal having parallel frame sides disposed on opposite sides of a medial plane, each side being integral with a semitubular sleeve half, the sleeve halves being connected to each other by upper and lower seams disposed in such medial plane. Each frame side is also integral with one end of a bridge, such bridge being spaced above a roller which is rotatably mounted between said frame sides on axle means perpendicular to such sides. A portion of such bridge is disposed in the medial plane and is generally coincident with a straight line which lies in the medial plane and intersects the extended axis of the sleeve on the opposite side of the axle means from such sleeve. The edges of the frame sides and of the bridge are flanged to prevent wear on a line passed over the roller.

BRIEF DESCRIPTION OF THE DRAWINGS

FIG. 1 is a perspective view of a single piece of sheet metal formed into a blank for two elongated legs, two frame sides and a bridge;

FIG. 2 is a perspective view corresponding to FIG. 1 but showing the legs partially formed into semitubular sides;

FIG. 2a is a perspective view illustrating the legs fully formed into semitubular sleeve sides;

FIG. 3 is a view showing a flange formed on edges of the frame sides and on one edge of the bridge;

FIG. 4 is a perspective view illustrating the integral frame and sleeve sides after bending of the bridge;

DETAILED DESCRIPTION OF THE PREFERRED EMBODIMENT:

FIG. 1 illustrates a one-piece sheet-metal blank having legs 10, frame sides 11 and a bridge 12. The blank is preferably formed of stainless steel. The legs 10, frame sides 11 and bridge 12 all lie in a single plane.

Figure 1A:
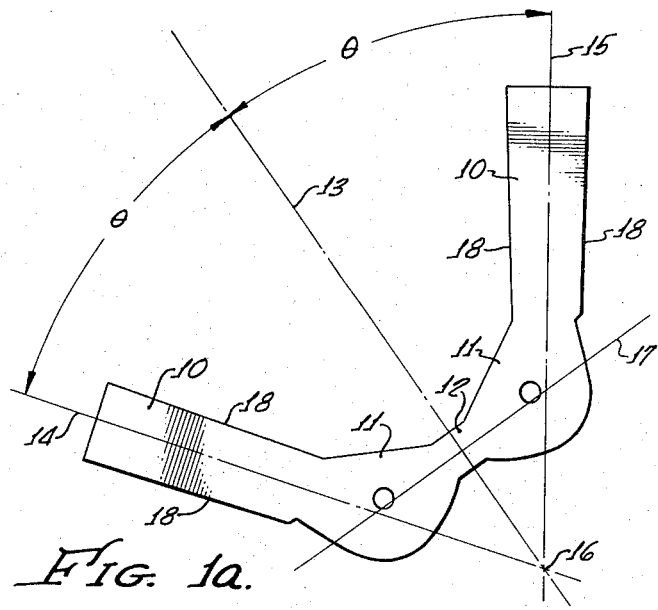
FIG. 1a is a plan view of such piece of sheet metal.

Referring particularly to FIG. 1a, the legs 10 (at this stage of the method of manufacture) are not parallel or nearly parallel to each other, but instead diverge (in a direction away from the frame sides) at a wide angle relative to each other. Thus, each leg 10 lies at an acute angle $\theta$ relative to a medial line which is indicated at 13 and which lies in the plane of the blank. Such line 13 intersects two lines 14 and 15 at an intersection point 16, such lines 14 and 15 being, respectively, medial lines in each of the legs 10.

The medial line 13 lies at the same acute angle relative to each of lines 14 and 15. For example, the angle between lines 14 and 15 may be approximately 73 degrees, so that the acute angle between line 13 and each of lines 14 and 15 may be approximately 36° or 37°. Such angle should be in the range of about 30° to about 45°.

Also as shown in FIG. 1a, the bridge 12 extends generally perpendicularly to the medial line 13. The medial line in the bridge 12 is represented at 17. The bridge is connected to each frame side at a region opposite the connection of the associated leg to such frame side.

It is emphasized that the legs 10 are relatively long, sufficiently long that the tubular sleeve formed thereby will mount securely over the tip of a fishing rod as described hereinafter. Although such legs 10 are long, the fact that the legs lie at major angles relative to each other permits "nesting" of the blanks in the die so that there is much less scrap sheet metal than would result if the legs were parallel or generally parallel to each other.

Each leg 10 has edges 18 which converge gradually in a direction toward the associated frame side 11. Thus, the resulting tubular sleeve (which fits over the rod tip) is not perfectly cylindrical but instead is frusto-conical.

As the next step in the method, and as shown in FIG. 2, the edges 18 and the regions between the same are bent upwardly as illustrated. This preforming step relative to the legs 10 permits a subsequent forming step (FIG. 2a) to form each of the legs 10 into semitubular shape without any flat regions.

Notches 19 are provided in the blank, as shown in FIG. 2, at the intersections between the outer ones of edges 18 and the adjacent edges of frame sides 11. Such notches 19 permit formation of the legs into tubular shape without interfering with the frame sides.

Referring next to FIG. 2a, and as indicated above, the next step comprises forming each of legs 10 into full semi-tubular shape. Thus, when the blank is so bent that the edges 18 on one of the legs 10 are respectively adjacent the edges 18 of the other leg, a full-tubular configuration will result.

Figure 8:
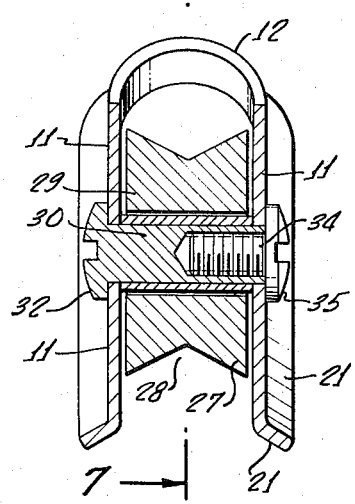
FIG. 8 is a sectional view on line 8—8 of FIG. 7 and illustrating the mounting of the roller between the frame sides.

In accordance with the next step in the method, and as shown in FIG. 3, a flange 21 is provided along one edge of each of frame sides 11 and along the corresponding edge of bridge 12. The obtuse angle formed between the flange and each frame side may be, for example, about sixty degrees (FIG. 8). Flange 21 is located on the edges which are remote from legs 10, that is to say, on the edges which are relatively adjacent the intersection point 16 (FIG. 1a). Such edges are generally convex, each convex curve starting at a notch 19 and continuing around to one end of bridge 12 (which has straight edges). The remaining edges of the frame sides are straight, as indicated at 22.

The flange 21 is so formed that it bends in the opposite direction from the edges 18 of legs 10. Thus, the edges 18 are formed upwardly (as indicated by FIGS. 2 and 2a), whereas the flange 21 is formed downwardly as indicated in FIG. 3. The ends of the flange 21 taper to very narrow regions adjacent notches 19.

The convex edges of frame sides 11, which are flanged as shown at 21, have center points or areas at or adjacent which are located holes 23. Such holes are formed in the blank at a suitable step in the manufacturing process, and serve to receive screws forming parts of the axle means for the roller.

Referring next to FIG. 4, the next step in the method comprises bending the bridge 12 about an axis which is substantially parallel to medial line 13 (FIG. 1a) in order to cause the frame sides 11 to be substantially parallel to each other, and in order to cause the edges 18 of legs 10 to be respectively opposite each other. The direction of bending is such that end portions of flange 21 extend away from each other, and edges 18 extend toward each other. During such bending operation, suitable die means are used to maintain at the indicated angle (FIG. 7) that portion of flange 21 which is formed on the edge of bridge 12.

Because of the fact that bending is effected about an axis parallel to medial line 13, there is little or no stretching of the metal as a result of the described bending operation. This is an important consideration since, in order to achieve economy of production, the gauge of the metal forming the blank illustrated in FIG. 1 is not made thicker than is required for the strength of the finished roller tip.

Figure 5:
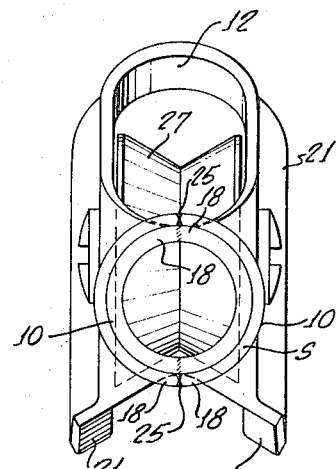
FIG. 5 is an end view looking at the left end in FIG. 4, but showing the upper and lower seams which connect the sleeve sides to form a single tubular sleeve, and also showing the roller in mounted condition.
Figure 9:
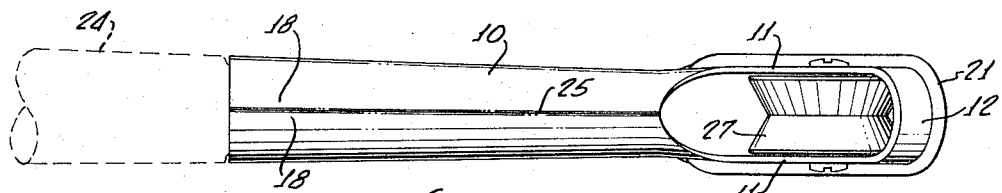
FIG. 9 is a top view of the roller tip.
Figure 10:
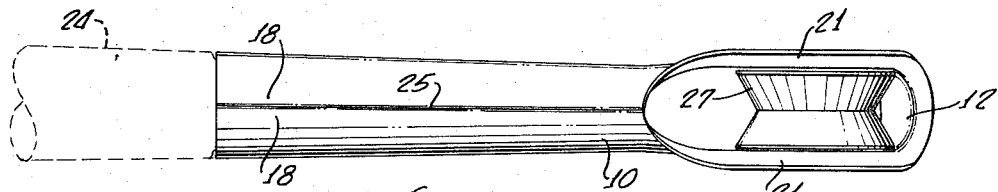
FIG. 10 is a bottom view thereof.
Figure 11:
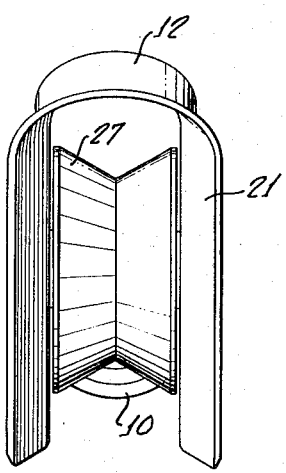
FIG. 11 is an end view of the roller tip as viewed from the right in FIG. 6.

Referring next to FIGS. 5, 9 and 10, the next step in the method comprises forming upper and lower seams or joints 25 between the edges 18 which are disposed opposite each other. Such joints are preferably formed by silver soldering or by brazing. Formation of such joints creates, as indicated above, the tubular sleeve S (elongated and frustoconical) adapted to fit over the tip of a fishing rod, such tip being represented at 24. Mounting of the tubular sleeve S on tip 24 may be effected in numerous ways, for example by means of epoxy resin, but does not take place until after completion of manufacturing of the roller tip as described below.

The roller tip is completed (after suitable deburring, chrome plating, etc.) by inserting a roller (sheave) 27 between the frame sides 11 as shown in FIG. 8. Such roller is preferably formed of stainless steel and has a V-sectioned groove 28 in the peripheral region thereof. The roller is rotatably mounted upon a bearing or bushing 29, and such bushing in turn is mounted on a hollow pin 30 having a screw head 32. Pin 30 is inserted through one of openings 23, and is internally threaded to receive the shank of a screw 34 inserted through the other opening 23 and having a head 35. The roller also may be mounted in position by means of a double-screw construction shown and described in the above-cited U.S. Pat. No. 3,058,255.

The tolerances between the radial faces of roller 27 and the adjacent inner surfaces of frame sides 11 are small. Therefore, and also because of the V-shaped section of the groove 28, the fishing line does not move out of the groove and become inserted between the roller and the frame.

Figure 6:
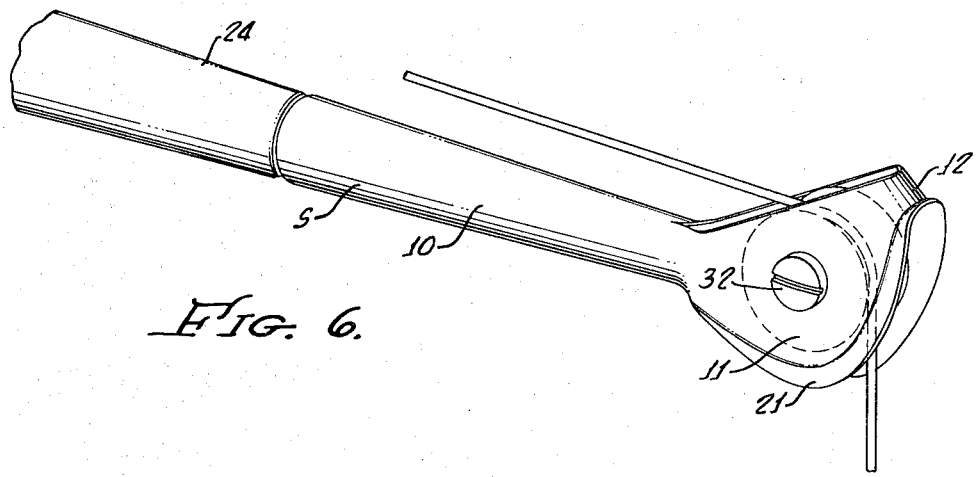
FIG. 6 illustrates the completed roller tip as mounted on the end of a fishing rod.

The product resulting from the above method, namely, the apparatus of the present invention, is a roller tip for fishing rods as shown in FIGS. 6 et seq., and which has a one-piece sheet-metal frame which is integral with the tubular sleeve formed by legs 10.

Figure 7:
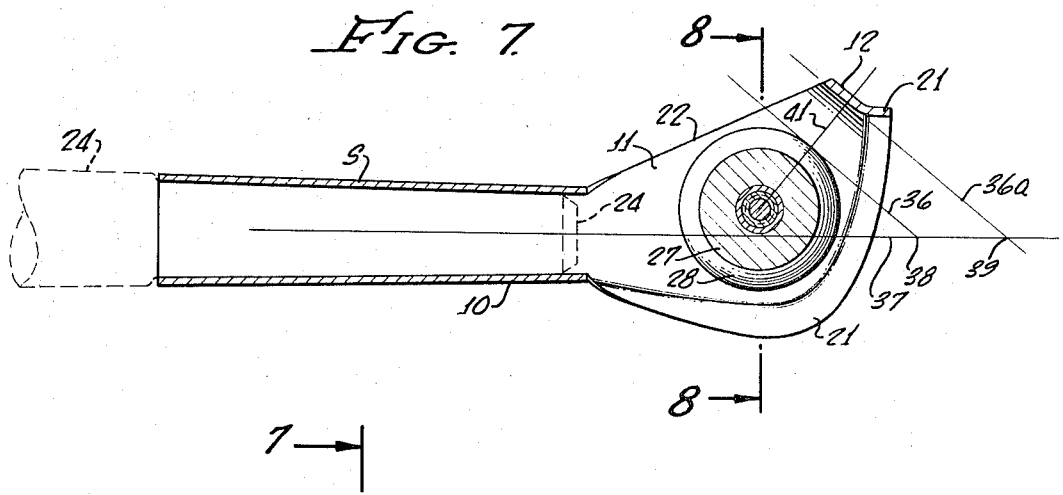
FIG. 7 is a longitudinal sectional view taken on line 7—7 of FIG. 8.

The finished roller tip may best be described relative to a medial (central) plane, namely, the plane of line 7—7 of FIG. 8, which line indicates the plane of the showing of FIG. 7. One half of the tubular sleeve S is located on each side of such medial plane, and the semitubular sleeve portions (formed by bending the legs 10) are joined along such medial plane by the upper and lower seams 25 (FIGS. 5, 9 and 10) of solder or the like. The two frame sides 11 are disposed on opposite sides of the medial plane, and are respectively integral with the semitubular sleeve portions on opposite sides of such plane. The roller 27 is mounted rotatably between the frame sides 11, on axle means (FIG. 8) which is perpendicular to the indicated plane. The bridge 12 connects the frame sides integrally, and extends through the plane.

Referring to FIG. 7, the main body of the bridge portion which is disposed in the indicated plane, that is to say, the portion of bridge 12 other than the flange 21 thereon, is generally parallel to a tangent 36 to the roller 27, such tangent 36 intersecting the extended axis 37 of sleeve S on the opposite side of the axle means from such sleeve. The intersection point between tangent 36 and the extended axis 37 of sleeve S is indicated at 38 in FIG. 7.

Stated more specifically, the bridge section (other than flange 21) in the medial plane is substantially coincident with a straight line 36a in such medial plane, which line intersects the extended sleeve axis 37 on the opposite side of the axle means from the tubular sleeve. The point of intersection is indicated at 39. Tangent 36 and line 36a are generally parallel to each other.

The tangent 36 and line 36a are perpendicular to a radius of roller 27, which radius passes through the bridge 12. The radius is shown at 41.

Flange 21 (FIG. 7) inclines upwardly relative to tangent line 36 and relative to line 36a, at the specified medial plane.

Tangent 36 and line 36a lie at an acute angle, relative to the sleeve axis 37, which is in the range of about 28° to about 46°. Preferably, such angle is on the order of about 37°.

As shown in FIG. 7, the axle means for roller 27 is disposed somewhat above the extended axis 37 of the tubular sleeve.

The flanges 21 on the frame sides and on the corresponding forward edge of bridge 12 flare outwardly away from the space between the frame sides and which contains roller 27. Thus, the outer edges of the flanges are normally not in contact with a line passed over the roller, so that wear on the line is maintained at a minimum.

The fishing line portion which passes (bends) over roller or sheave 27 is generally parallel to the bridge section adjacent thereto. The relationship is such that the fishing line will not engage either extreme edge of the bridge 12 (including the flange portion 21), even when the line leaves the roller as, for example, during casting of a bait. Thus, wear on the line is again minimized.

The word "integral" is used in this specification and claims to mean formed of a single piece of sheet metal, without any welds, connections or other bonds or joints.

The foregoing detailed description is to be clearly understood as given by way of illustration and example only, the spirit and scope of this invention being limited solely by the appended claims.

We claim:

1. A roller tip for fishing rods, which comprises: a pair of opposed, elongated, semitubular sleeve sides formed of sheet metal,
   one of said sleeve sides being disposed on one side of a medial plane,
   the other of said sleeve sides being disposed on the opposite side thereof,
   the edges of said sleeve sides being respectively opposed,
first and second seams connecting together the opposed edges of said sleeve sides,
   said seams being disposed generally in said plane,
   said semitubular sleeve sides and said seams forming an elongated tubular sleeve adapted to be mounted directly on the tip of a fishing rod, without any intervening socket or other element,
a pair of opposed sheet-metal frame sides each of which is integral with one of said sleeve sides,
   said frame sides being generally parallel to said medial plane and being spaced therefrom on opposite sides thereof,
a roller mounted between said frame sides,
axle means extending between said frame sides to rotatably mount said roller,
   said axle means being perpendicular to said frame sides and to said medial plane, and
a sheet-metal bridge integral with both of said frame sides,
   said bridge extending through said medial plane in spaced relationship from said roller whereby a fishing line may pass between said roller and said bridge,
   said bridge having a main body and an edge portion said edge portion being remote from said sleeve,
   a part of said bridge being disposed in said medial plane,
      a substantial portion of said main body of said part being generally coincident with a straight line which lies in said medial plane and intersects the extended axis of said sleeve on the side of said axle means remote from said sleeve.

2. The invention as claimed in claim 1, in which edge portions of said frame sides and of said bridge are flared outwardly to minimize the wear occurring upon contact of said fishing line therewith, one of said flared edge portions being said bridge edge portion remote from said sleeve.

3. The invention as claimed in claim 1, in which each of said frame sides has a relatively straight edge and a generally arcuate edge, said straight edge terminating adjacent one of said seams, said arcuate edge terminating adjacent the other of said seams, and in which an outwardly bent flange is formed integrally on said arcuate edge.

4. The invention as claimed in claim 3, in which said outwardly bent flange also extends along the corresponding edge of said bridge, such corresponding edge of said bridge being the one on said bridge edge portion remote from said sleeve.

5. The invention as claimed in claim 1, in which said bridge part lying in said medial plane has formed thereon a flange which is inclined upwardly relative to said straight line, said flange comprising said bridge edge portion remote from said sleeve.

6. The invention as claimed in claim 1, in which said straight line is perpendicular to an extended radius of said roller, said extended radius passing through said bridge.

7. The invention as claimed in claim 1, in which said straight line lies at an angle to such sleeve axis in the range of about 28° to about 46°.

* * * * *